United States Patent [19]

Negishi et al.

[11] Patent Number: 5,047,884
[45] Date of Patent: Sep. 10, 1991

[54] MAGNETIC HEAD HAVING A CONTROL PORTION FOR GENERATING NEGATIVE PRESSURE

[75] Inventors: Kenji Negishi; Daisuke Mitsuhashi, both of Tokyo; Yoshiaki Kato; Akira Takimoto, both of Kanagawa; Noboru Kawasaki, Tokyo, all of Japan

[73] Assignee: Fuji Photo Film Co., Ltd., Kanagawa, Japan

[21] Appl. No.: 461,508

[22] Filed: Jan. 5, 1990

[30] Foreign Application Priority Data

Jan. 17, 1989 [JP]  Japan ................................. 1-5918
Mar. 24, 1989 [JP]  Japan ................................. 1-70349
Jun. 9, 1989 [JP]  Japan ................................. 1-145445

[51] Int. Cl.$^5$ ..................... G11B 5/187; G11B 15/60
[52] U.S. Cl. ..................... 360/122; 360/130.34; 360/103; 360/130.3; 360/99.05
[58] Field of Search ............... 360/102–109, 360/137, 122, 130.3–130.34, 99.01, 99.05

[56] References Cited

U.S. PATENT DOCUMENTS

| 4,375,656 | 3/1983 | Madman, Jr. et al. | 360/102 |
| 4,396,965 | 8/1983 | DeMoss | 360/103 |
| 4,414,592 | 11/1983 | Losee et al. | 360/103 |
| 4,700,248 | 10/1987 | Coughlin et al. | 360/103 |
| 4,809,105 | 2/1989 | Imanishi et al. | 360/104 |
| 4,833,556 | 5/1989 | Kosarko et al. | 360/102 |
| 4,858,043 | 8/1989 | Kadokura et al. | 360/130.34 |

FOREIGN PATENT DOCUMENTS

| 53-29111 | 3/1978 | Japan | 360/103 |
| 54-17708 | 9/1979 | Japan | 360/109 |
| 55157161 | 12/1980 | Japan | 360/99.05 |
| 58-177558 | 11/1983 | Japan | 360/103 |
| 60-219671 | 11/1985 | Japan | 360/99.5 |
| 0009868 | 1/1986 | Japan . | |
| 0033380 | 2/1987 | Japan . | |
| 62-109250 | 5/1987 | Japan | 360/130.3 |
| 0215458 | 1/1990 | Japan | 360/102 |

OTHER PUBLICATIONS

IBM Tech. Discl. Bull., vol. 20, No. 8, Jan. 78, pp. 3285–3286 "Sprencal Multigroove Magnetic Head Design" by W. Hehl.
IBM Tech. Discl. Bull., vol. 20, No. 3, Aug. 77, pp. 1130–1131 "Transducer Support Structure for Flexible Magnetic Disk Pack" by A. W. Orlando.
IBM Tech. Discl. Bull., vol. 20, No. 3, Aug. 77, pp. 1132–1133 "Transducer Head for Multiple Flexible Disk Pack", by J. A. Weidenhammer.

Primary Examiner—John H. Wolff
Assistant Examiner—Alfonso Garcia
Attorney, Agent, or Firm—Sughrue, Mion, Zinn Macpeak & Seas

[57] ABSTRACT

A magnetic head having a control portion provided integrally with an opposing surface located opposing the recording surface of a magnetic disc or a head mount for generating a negative pressure between the control portion and the magnetic disc to attract the magnetic disc towards the magnetic head, thereby generating an adequate and sufficient negative pressure in the vicinity of the magnetic head and achieving a good head touch. This configuration enables compact design of the mechanism and an increased recording area of the magnetic disc compared with the case in which a magnetic head and a negative pressure generation type stabilizing plate to attract the magnetic disc towards the magnetic head are separately disposed, and eliminates the need for procedures for separate positioning of the individual magnetic head and stabilizing plate, thereby achieving a considerable reduction in manufacturing steps and production cost.

13 Claims, 8 Drawing Sheets

MAGNETIC HEAD HAVING A CONTROL PORTION FOR GENERATING NEGATIVE PRESSURE

BACKGROUND OF THE INVENTION

This invention relates to a magnetic head comprising a control portion to generate a negative pressure, integrally formed on the surface of the magnetic head facing a magnetic disc, thereby achieving a good head touch.

In a recording and reproduction device which uses a thin, flexible magnetic disc as a recording medium, when the magnetic head is simply caused to come in contact against the magnetic disc, the magnetic disc tends to be deformed by the pressure of the magnetic head and to come out of the magnetic head, and stable contact is not obtained.

Heretofore, there has been an attempt in which a stabilizing plate is provided in the vicinity of the magnetic head, which generates a negative pressure in the area where the magnetic head is located, to attract the magnetic disc towards the magnetic head side, thereby achieving a stable contact.

Figure 17:
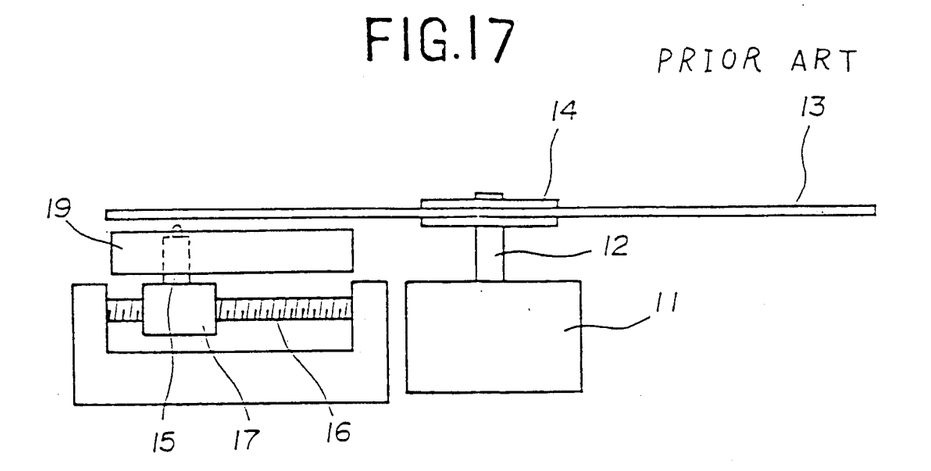
FIG. 17 is a schematic side view showing a prior art recording and reproduction device.
Figure 18:
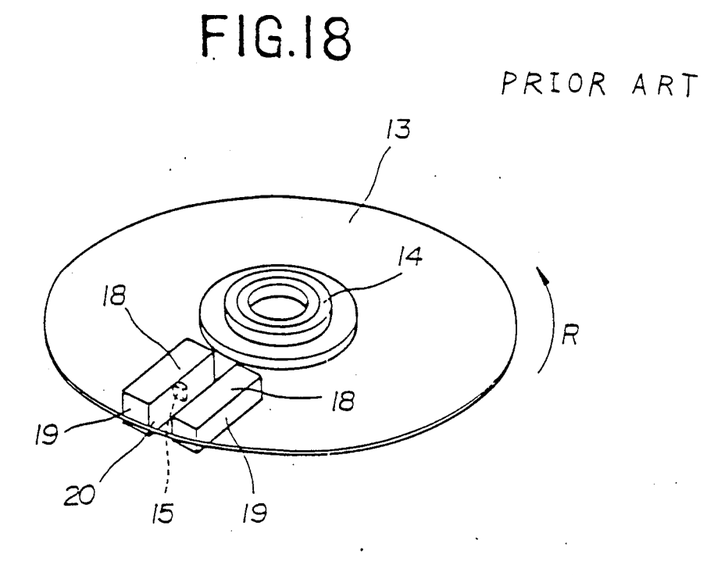
FIG. 18 is a schematic perspective view showing part of the recording and reproduction device shown in FIG. 17.

FIG. 17 is a schematic view showing structure of the prior art magnetic disc recording and reproduction device, and FIG. 18 is a schematic perspective view showing part of the device. Referring to these figures, a center core mounted at the center of a magnetic disc 13 is detachably attached to a drive shaft 12 of a drive motor 11 to rotate the magnetic disc 13, and the magnetic disc 13 is rotated at a predetermined rotational speed by the rotation of the drive motor 11.

Below the magnetic disc 13 shown in the figures is disposed a magnetic head 15 which is capable of contacting against the recording surface of the magnetic disc 13 during recording and reproduction operation. The magnetic head 15 is fixed to a carriage 17 engaged with a threaded shaft 16 disposed along the radial direction of the magnetic disc 13 and, by rotating the treaded shaft 16 by a drive unit (not shown), the magnetic head 15 is moved in the radial direction of the magnetic disc 13 to scan the recording surface.

The magnetic head 15 has a head mount 22 fixed to the carriage 17 and a head chip 22 which is fixed to the end of the head mount and has a magnetic gap on a surface opposing the magnetic disc 13, and the magnetic disc 13 comes in sliding contact against the magnetic gap of the head chip to perform recording and reproduction.

Heretofore, the opposing surface having the magnetic gap is formed in a smoothly curved surface protruding towards the magnetic disc 13 side along the rotational direction (arrow R) and the radial direction of the magnetic disc 13 to prevent the recording surface of the magnetic disc 13 from being damaged and to obtain a good head touch.

Figure 19:
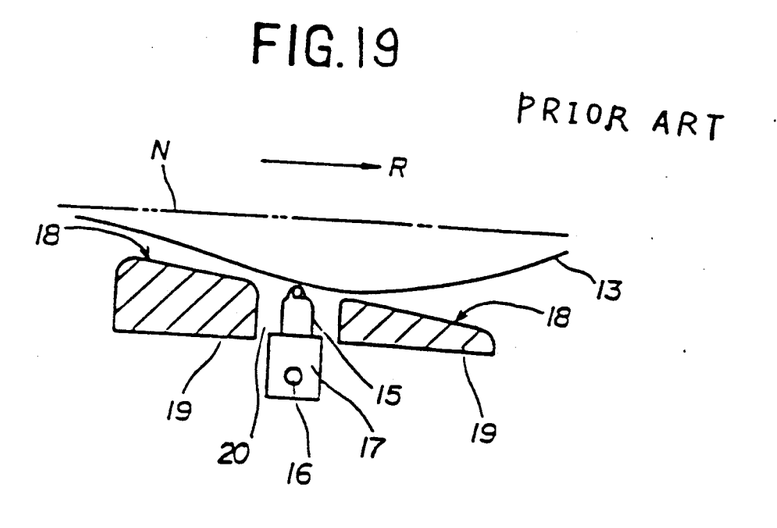
FIG. 19 is a schematic cross sectional view showing a prior art recording and reproduction device.

Furthermore, as shown in FIG. 19, below the magnetic disc 13, a pair of stabilizing plates 19 are provided having inclined surfaces 18 of which one end is located in the vicinity of a free rotary surface N at the upstream side with respect to the rotational direction (arrow R) of the magnetic disc 13 and inclined so as to gradually become more distant from the free rotary surface N towards the downstream side with respect to the rotational direction, with a gap 20 as a moving path of the magnetic head 15.

Thus, the stabilizing plates 19 generate a negative pressure in the area between the magnetic disc 13 and inclined surfaces 18 of the stabilizing plates 19 as the magnetic disc 13 rotates, whereby the negative pressure attracts the magnetic disc 13 towards the magnetic head 15 side to cause the magnetic disc 13 to contact the magnetic gap 24 of the head chip 22 of the magnetic head 15. As a result, in the recording and reproduction operation, the magnetic disc 13 always maintains a stable contact state with the magnetic head 15.

Such negative pressure-generation type stabilizing plates are described in detail, for example, in Japanese Patent Publication Laid-open No. 61-9868/1986, Japanese Patent Publication Laid-open No. 60-219671/1985, Japanese Patent Publication Laid-open No. 62-33380/1987.

In this Specification, the free rotary surface N refers to a rotary surface of the magnetic disc 13 attached to the drive motor 11 of the magnetic disc recording and reproduction device, rotating with no action of external forces other than the rotary driving force.

With the stabilizing plates 19 of a type as shown in FIG. 19, a gap 20 for the magnetic head 15 and the carriage 17 to move the magnetic head is formed between the pair of the stabilizing plates 19. However, since negative pressure is generated by the stabilizing plates 19 mainly in the area between the inclined surfaces 18 formed on the stabilizing plates 19 and the magnetic disc 13, the gap 20 is not concerned in the generation of negative pressure, but rather tends to reduce the negative pressure generated.

Therefore, the above configuration has been defective in that the magnetic disc 13 is attracted towards the inclined surfaces of pair of stabilizing plates 19 located at both sides of the magnetic head 15, but tends to be floated up at the gap 20 where the magnetic head 15 is located, resulting in insufficient contact of the magnetic disc 13 with the magnetic head 15.

Furthermore, since the magnetic head 15 and the stabilizing plates 19 are provided separately, it requires a very complex effort to precisely position the magnetic head 15 and the stabilizing plates 19, which can lead to an increase in cost.

Object of the Invention

With a view to eliminate the above prior art problems of magnetic heads, it is a primary object of the present invention to provide a magnetic head which has a control member to generate an appropriate and sufficient negative pressure, thereby achieving a good head touch, as well as simplified positioning of the magnetic head and the control member.

SUMMARY OF THE INVENTION

In accordance with the present invention which attains the above object, there is provided a magnetic head having an opposing surface located opposing the recording surface of a magnetic disc and a magnetic gap formed on the opposing surface, characterized by a control portion formed on the opposing surface to generate a negative pressure between the member and the magnetic disc as the magnetic disc rotates, which attracts the magnetic disc towards the magnetic gap side.

Thus, the control portion formed on the opposing surface of the magnetic head opposing the magnetic disc generates a negative pressure between the magnetic disc and the control portion as the magnetic disc rotates, and the negative pressure attracts the magnetic disc towards the magnetic head side to cause the magnetic disc to come in sliding contact with the magnetic gap formed on the opposing surface, thereby achieving a good head touch.

The control portion can be an inclined surface inclined to become farther from the free rotary surface of the magnetic disc towards the downstream side with respect to the rotational direction of the magnetic disc, and the inclination of the inclined surface relative to the free rotary surface of the magnetic disc may be varied along the rotational direction of the magnetic disc. Furthermore, the control portion may be provided with a groove along the rotational direction of the magnetic disc to increase generation of negative pressure and rectify the air flow.

There is also provided according to the prsent invention a magnetic head having a head mount and a head chip which is mounted to the head mount and has a head chip capable of coming in sliding contact against the magnetic disc, characterized by a control portion formed integrally with the head mount for generating a negative pressure between the control portion and the magnetic disc to attract the magnetic disc towards the head chip side.

Thus, as the magnetic disc rotates, the control portion formed on the head mount generate a negative pressure between the control portion and the magnetic disc to attract the magnetic disc towards the head chip side and cause the magnetic disc to come in sliding contact with the head chip, thereby achieving a good head touch.

Description of the Preferred Embodiments

A preferred embodiment of the present invention will now be described in detail with reference to the drawings. Since, in this embodiment, the mounting position and mounting structure of the inventive magnetic head in the recording and reproduction device are same as in the prior art, the same members are used in the prior art are indicated using the same reference numbers, and description thereof is omitted.

Figure 1:
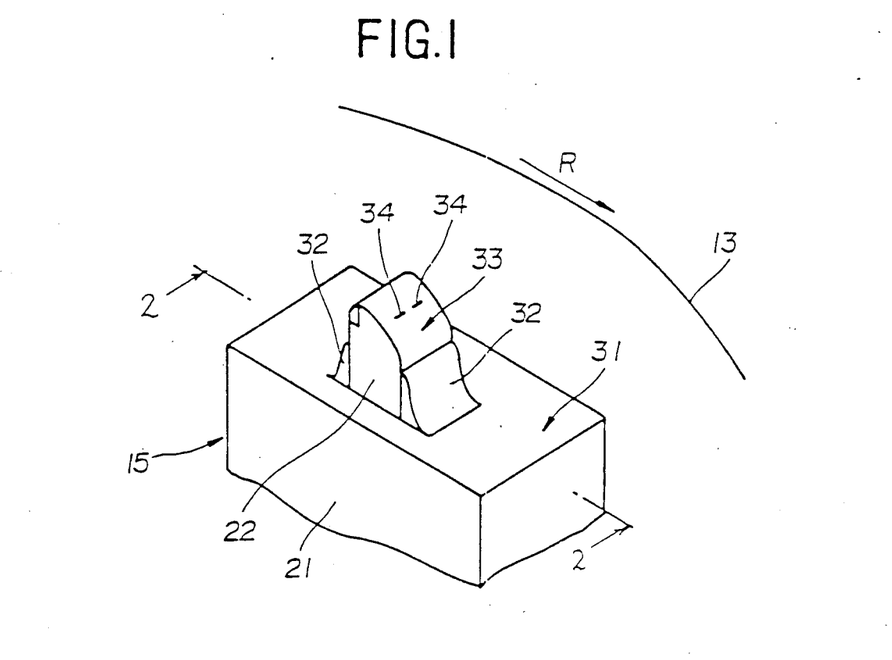
FIG. 1 is a schematic perspective view showing an embodiment of the magnetic head according to the present invention.

Referring to FIG. 1 showing this embodiment, an end surface 31 of a head mount 21 is provided protrudingly with mounting members 32 to clamp a head chip 22 and fix it integrally with the head mount 21, and the head chip 22 is integrally mounted to the mounting members 32. An opposing surface 33 which comes in sliding contact with the recording surface of a magnetic disc 13 is formed at the front end of the head chip 22 opposing the recording surface of the magnetic disc 13.

Figure 2:
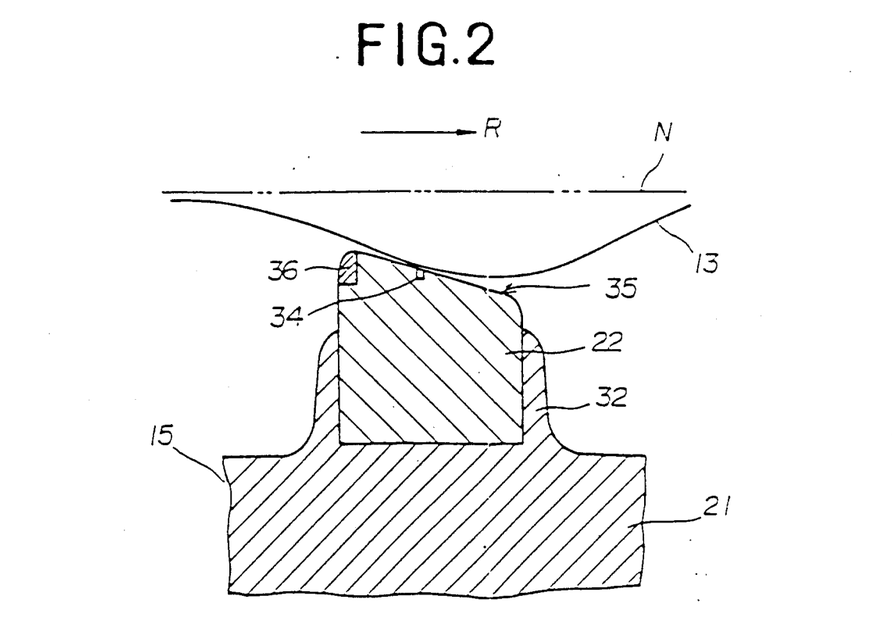
FIG. 2 is a schematic cross sectional view taken along line 2—2 in FIG. 1.

At nearly the center of the opposing surface 33 is formed a plurality (2 in this embodiment) of magnetic gaps 34, which come in sliding contact with the recording surface of the magnetic disc 13 to make mediation (transmission and reception) of magnetic information, along nearly the radial direction of the magnetic disc 13. As shown in FIG. 2 which is a schematic cross sectional view taken along line 2—2 in FIG. 1, the opposing surface 33 is formed as an inclined surface 35 which is inclined so as to become more distant from the free rotary surface N of the magnetic disc 13 towards the downstream side with respect to the rotational direction (arrow R) of the magnetic disc 13.

As a result, as the magnetic disc 13 rotates, a negative pressure is generated between the inclined surface 35 of the head chip 22 and the magnetic disc 13, which attracts the magnetic disc 13 towards the head chip 22 side and causes the magnetic disc 13 to come in sliding contact against the magnetic gap 34 provided at the end of the head chip 22, thereby achieving a good head touch.

Furthermore, an end portion 36 of the head chip 22 located at the upstream side of the magnetic disc 13 with respect to its rotational direction is made of a material harder than the head chip 22, such as sapphire, to prevent abrasion due to sliding with the magnetic disc 13.

Figure 3:
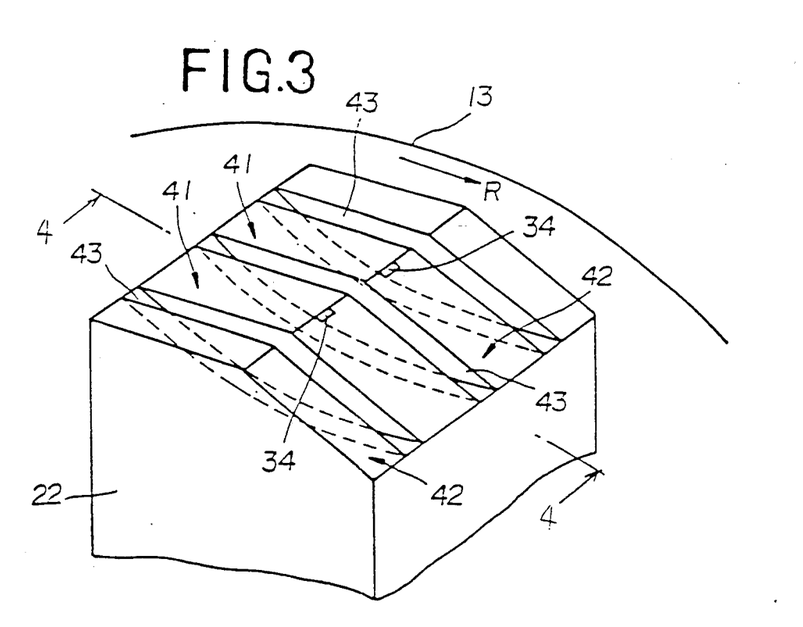
FIG. 3 is a schematic perspective view showing another embodiment of the inventive magnetic head.
Figure 4:
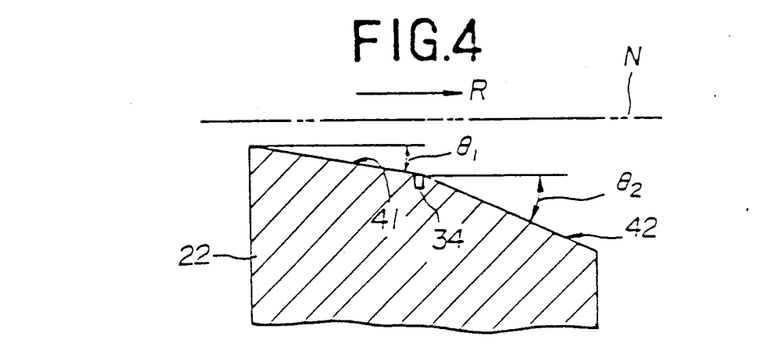
FIG. 4 is a schematic cross sectional view taken along line 4—4 in FIG. 3.

Referring to FIG. 3 showing another embodiment, a plurality (2 in this embodiment) of magnetic gaps 34 are provided on the opposing surface of the head chip 22 opposing the magnetic disc 13 along nearly the radial direction of the magnetic disc 13. On the opposing surfaces located respectively at the upstream side and the downstream side of the magnetic gaps 34 with respect to the rotational direction of the magnetic disc 13 are provided an inclined surface 41 and an inclined surface 42. As shown in FIG. 4 which is a cross sectional view taken along line 4—4 in FIG. 3, these incline surfaces 41 and 42 are formed so as to become farther from the free rotary surface N of the magnetic disc 13 towards the down stream side with respect to the rotational direction (arrow R) of the magnetic disc 13, and inclination angle $\theta_2$ of the inclined surface 42 to the free rotary surface N is greater than inclination angle $\theta_1$ of the inclined surface 41 to the free rotary surface N.

Figure 5:
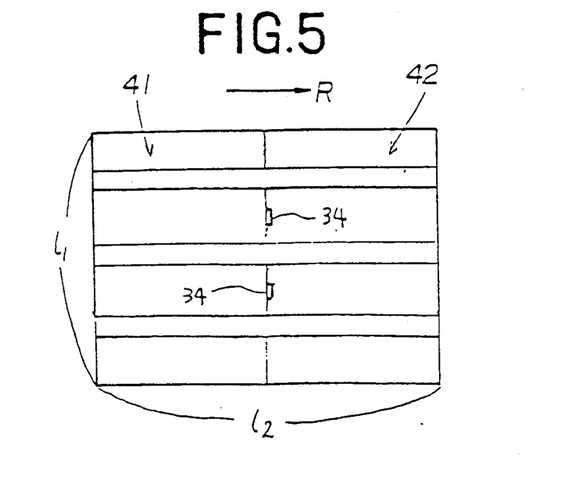
FIG. 5 is a schematic plan view showing another embodiment of the inventive magnetic head.

Preferable inclination angles $\theta_1$ and $\theta_2$ are, for example, $\theta_1 = 1°$ to $3°$, whereas $\theta_2 = 2°$ to $6°$, a value which is approximately double the value of $\theta_1$. Referring to FIG. 5 which is a schematic plan view of the head chip 22 shown in FIG. 3, the size of the opposing surface of the head chip 22 opposing the magnetic disc 13 is preferably to be at least $l_1 = 1.2$ mm and $l_2 = 1.2$ mm, where $l_1$ is the length of a side which is nearly perpendicular to the rotational direction (arrow R) of the magnetic disc 13 and $l_2$ is the length of a side along the rotational direction.

Therefore, as the magnetic disc 13 rotates, a negative pressure is generated in the area surrounded by the magnetic disc 13 and the inclined surfaces 41 and 42, which attracts the magnetic disc 13 towards the head chip 22 to come in sliding contact with the head chip 22. However, since the inclination angle of the inclined surface 42 located at the downstream side with respect to the rotational direction of the magnetic disc 13 is greater that the inclination angle of the inclined surface 41 located at the upstream side, the magnetic disc 13 is attracted by a greater negative pressure at the downstream side of the magnetic gap 34. As a result, the magnetic disc 13 is attracted while being deformed at both sides of the magnetic gap 34, thus improving touching of the magnetic disc 13 to the magnetic gap 34.

In this embodiment, a plurality (3 in this embodiment) of grooves 43, which are formed along nearly the rotational direction of the magnetic disc 13 over both the inclined surfaces 41 and 42, are disposed along nearly the radial direction of the magnetic disc 13. The grooves 43 are formed continuously from the upstream end of the inclined surface 41 to the downstream end of the inclined surface 42, and have a nearly arc-formed cross section so that the depth is zero at the upstream end and downstream end.

The grooves 43 absorb air flow of nearly radial direction other than that in the rotational direction (circumferential direction) which is mainly generated by the rotation of the magnetic disc 13 of the magnetic disc 13, and cause it to flow along the rotational direction, thereby controlling air flow in nearly the radial direction which hinders generation of the negative pressure. In addition, since the grooves 43 can expand the area between the magnetic disc 13 and the head chip 22, they can increase the negative pressure generated in the area. Furthermore, the grooves 43 also have an action to stabilize the air flow (forming a laminar flow) in the rotational direction of the magnetic disc 13, thereby even further improving head touch of the magnetic disc 13.

Figure 6:
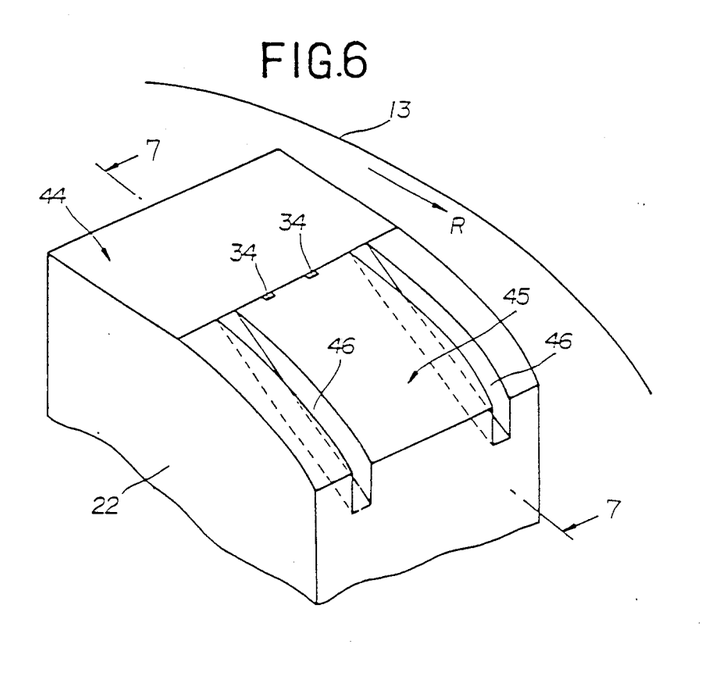
FIG. 6 is a schematic perspective view showing another embodiment of the inventive magnetic head.
Figure 7:
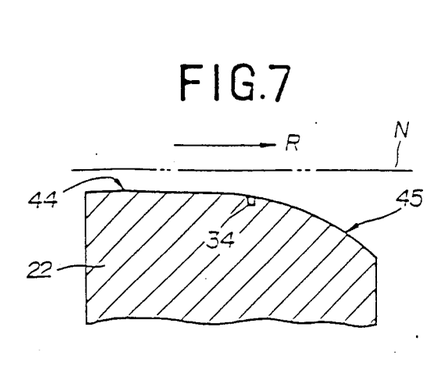
FIG. 7 is a schematic cross sectional view taken along line 7—7 in FIG. 6.

Referring to FIG. 6 which is a schematic perspective view showing another embodiment and to FIG. 7 which is a schematic cross sectional view taken along line 7—7 in FIG. 6, the opposing surface of the head chip 22 opposing the magnetic disc 13 located at the upstream side of the magnetic gap 34 with respect to the rotational direction (arrow R) of the magnetic disc 13 has a flat surface 44 having a zero inclination angle, that is, parallel to the free rotary surface N of the magnetic disc 13. At the front end of the head chip 22 located at the downstream side of the magnetic gap with respect to the rotational direction of the magnetic disc 13 is provided a smooth inclined curved surface 45 formed so that it becomes gradually more distant from the free rotary surface N of the magnetic disc 13 towards the downstream side with respect to the rotational direction of the magnetic disc 13.

Figure 8:
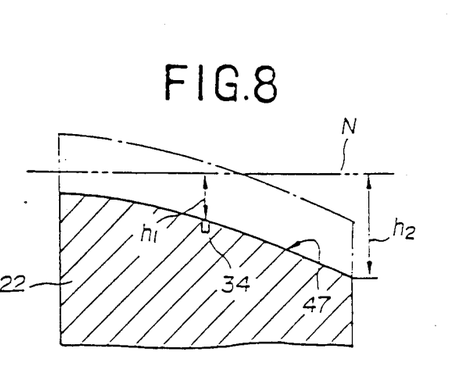
FIG. 8 is a schematic side cross sectional view showing another embodiment of the inventive magnetic head.

The inclined curved surface 45 has a plurality (2 in this embodiment) of grooves 46, which are formed along nearly the rotational direction of the magnetic disc 13 and disposed at both sides of the magnetic gap 34 along nearly the rotational direction of the magnetic disc 13. The grooves 46, which have depths of zero at the upstream end of the inclined curved surface 45 and have predetermined depths at the downstream end of the inclined curved surface 45, communicate with the downstream side area of the head chip 22. The groove 46 preferably have a maximal depth of 50μm. In this embodiment, the flat surface 44 parallel to the free rotary surface N of the magnetic disc 13 is formed on the opposing surface of the head chip 22 opposing the magnetic disc 13. Alternatively, however, an inclined curved surface 47 may be formed, for example, as shown in FIG. 8, over the entire opposing surface, which is gradually inclined so as to become more distant from the free rotary surface N towards the downstream side with respect to the rotational direction of the magnetic disc 13.

In this case, where distance between the magnetic gap 34, which is located nearly at the center of the inclined curved surface 47, and the free rotary surface N is $h_1$, and distance between the downstream end of the inclined curved surface 47 and the free rotary surface N is $h_2$, it is preferable to set, for example, to $h_1 = 0$ to 100μm and $h_2 = 200$ μm, or, as shown by dot-bar lines in the figure, position of the inclined curved surface 47 is moved parallelly by 0 to 200 μm towards the free rotary surface N side to position part or the entire of the inclined curved surface 47 above (in the figure) the free rotary surface N.

Thus, as the magnetic disc 13 rotates, a negative pressure is generated in the area betwen the magnetic disc 13 and the inclined curved surface 45 or 47, which attracts the magnetic disc 13 towards the front end of the head chip 22 to cause the magnetic disc 13 to come in sliding contact with the magnetic gap 34, and the groove 46 absorbs the air flow in nearly the radial direction of the magnetic disc 13 to increase the negative pressure and regulates the entire air flow generated in association with the rotation of the magnetic disc 13 to be a laminar flow, thereby achieving a stable head touch.

In the above described embodiments, the inclined surfaces 41 and 42, or the flat surface 44 and the inclined curved surface 45, are individually formed at the upstream side and the downstream side of the magnetic gap 34. However, position of the magnetic gap 34 may be shifted from the boundary of the inclined surface 41 and the inclined surface 42, or that of the flat surface 44 and the inclined curved surface 45. Or, an increased number (3 or more) of inclined surfaces with different inclination angles to the free rotary surface N of the magnetic disc 13 may be formed on the opposing surface of the head chip 22 opposing the magnetic disc 13 along the rotational direction of the magnetic disc 13. Thus, inclination angle of the inclined surface to the free rotary surface N of the magnetic disc 13 may be varied along the rotational direction of the magnetic disc 13.

Furthermore, shapes and positions and number of the grooves 43 and 46 are not restricted to those of the embodiments, but it is only required that these grooves are formed on the opposing surface of the head chip 22 opposing the magnetic disc 13 along the rotational direction of the magnetic disc 13.

An example of the magnetic head 15, which is fabricated for use in a recording and reproduction device for a 2-inch magnetic video floppy disc, uses a head chip which is almost the same as the head chip 22 shown in FIG. 6. The head chip 22 has an approximately 2-mm square cross section, the inclined curved surface 45 is formed on the part of about ¾ the area at the downstream side of the head chip 22, the two magnetic gaps 34 are formed with an approximately 100 μm spacing and are positioned at nearly the center of the front end of the head chip 22. In experiments, this magnetic head has been confirmed to achieve a very good head touch.

Figure 9:
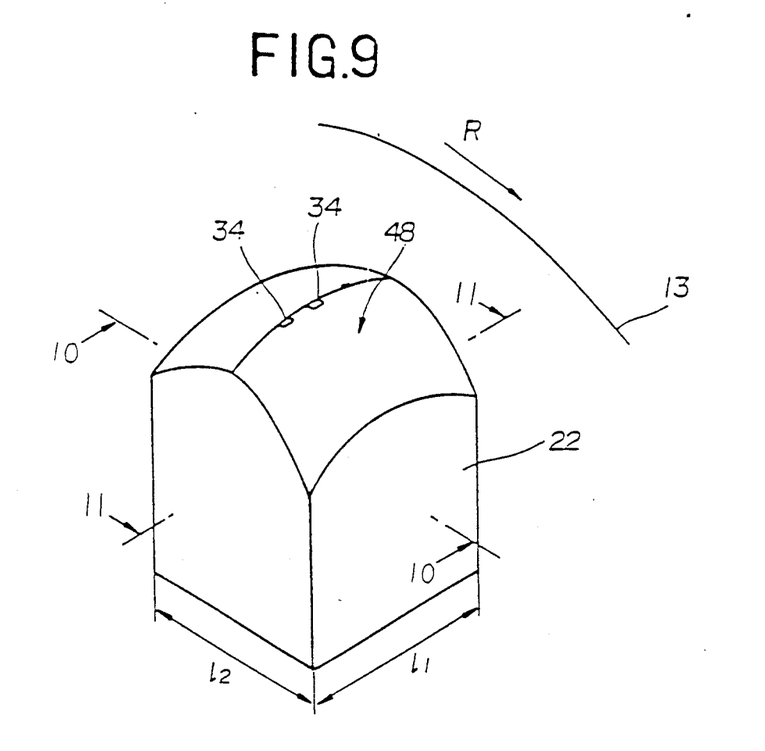
FIG. 9 is a schematic perspective view showing another embodiment of the inventive magnetic head.
Figure 10:
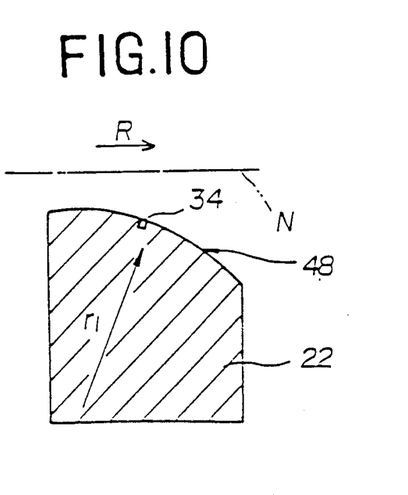
FIG. 10 and FIG. 11 are schematic cross sectional views taken along lines 10—10 and 11—11, respectively.
Figure 11:
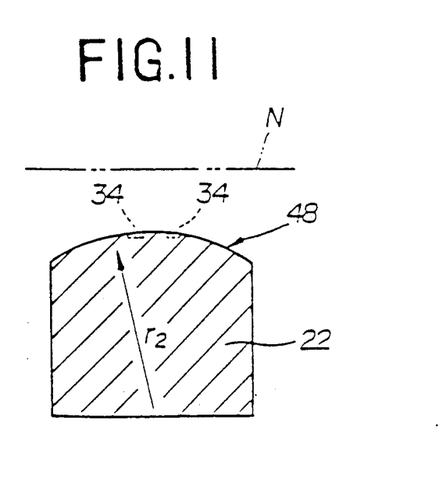

FIG. 9 is a schematic perspective view of another embodiment of the inventive magnetic head, and FIG. 10 is a schematic cross sectional view of the head chip 22 taken along line 10—10 in FIG. 9, that is, along the rotational direction (arrow R) of the magnetic disc 13. Referring to FIG. 9 and FIG. 10, an opposing surface 48 of the head chip 22 opposing the magnetic disc 13 is inclined, for example, with a curvature radius of $r_1$, to gradually become more distant from the free rotary surface N of the magnetic disc 13 along the rotational direction of the magnetic disc 13. On the other hand, as shown in FIG. 11 which is a schematic cross sectional view of the head chip 22 taken along line 11—11, that is, along the radial direction of the magnetic disc 13, the opposing surface 48 of the head chip 22 is inclined, for example, with a curvature radius $r_2$, so that the magnetic gap 34 is at the top.

Therefore, the opposing surface 48 of the head chip 22 is a nearly spherical curved surface with the magnetic gap 34 at the top and, when $r_1$ and $r_2$ are set almost equally, its curvature radius may be, for example, approximately 50 to 150 mm. Alternatively, however, $r_1$ and $r_2$ may be set differently so that the cross sectional edge of the head chip 22 is straight along the radial direction of the magnetic disc 13, that is, $r_2 = \infty$. Thus, a control portion is formed on the opposing surface 48 of the head chip 22 opposing the magnetic disc 13 which, with high-speed rotation of the magnetic disc 13, generates a negative pressure between the control portion and the magnetic disc 13 to attract the magnetic disc 13. Furthermore, grooves as previously described with reference to FIG. 3 and FIG. 6 may be formed on the opposing surface 48 along the rotational direction of the magnetic disc 13 to regulate air flow and promote generation of negative pressure.

The head chip 22 thus provided with the negative pressure generating control portion may have such dimensions as shown in FIG. 9 in which $l_1$ is at least about 1.2 mm and $l_2$ is at least about 1.2 mm, where $l_2$ is the length of a side along the rotational direction of the magnetic disc 13 and $l_1$ is the length of a side perpendicular to the rotational direction.

Thus, in the inventive magnetic head 15, the control portion, which has the same function as the stabilizing plate, is provided integrally on the opposing surface of the very small head chip 22 opposing the magnetic disc 13 to ensure the head touch, thereby enabling very efficient utilization of the recording surface of the magnetic disc 13. For example, when the above-described 2-mm square head chip 22 is applied to a 2-inch magnetic video floppy disc, the floppy disc has a diameter of about 23.5 mm, which is substracted by a center hub diameter of about 9 mm, 2 mm for the head chip 22, and an allowance of 1 mm (a total of 2 mm for the diameter) at the periphery of the floppy disc, the floppy disc has an effective diameter of 10.5 mm, which enables formation of about 105 tracks.

Since the use of the inventive magnetic head 15 eliminates the need for the negative pressure generation type stabilizing plate 19 separate from the magnetic head 15, positioning of the individual magnetic head 15 and the stabilizing plate required for prior art systems can be eliminated, thereby enabling very simplified production procedures.

Figure 12:
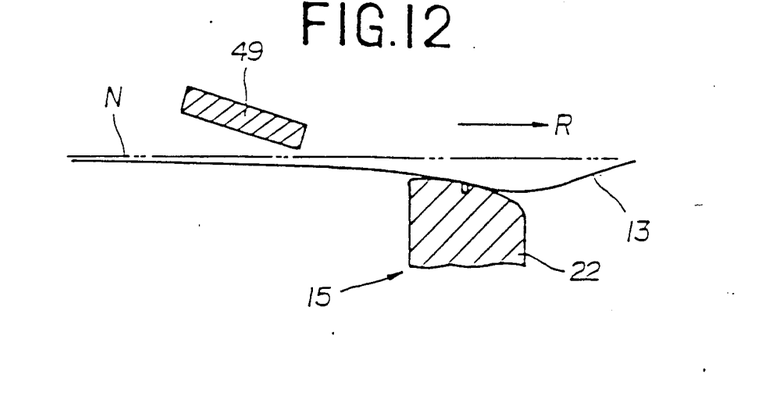
FIG. 12, FIG. 13 and FIG. 14 are schematic cross sectional views showing examples of control members.

In order to even further improve the head touch of the magnetic head 15, it is also possible to combine the magnetic head 15 with an auxiliary control member. In an example of such configuration as shown in FIG. 12, a positive pressure generating control member 49 is disposed at the opposite side of the head chip 22 of the inventive magnetic head 15 with respect to the free rotary surface N of the magnetic disc 13 and at the upstream side of the rotational direction (narrow R) of the magnetic disc 13. As the magnetic disc 13 rotates, a positive pressure is generated between the control member 49 and the magnetic disc 13 which pushes the magnetic disc 13 towards the magnetic head 15 side, thereby even further improving the effect of the above-described various types of negative pressure generation type control portion formed on the head chip 22 at the end of the magnetic head 15.

Figure 13:
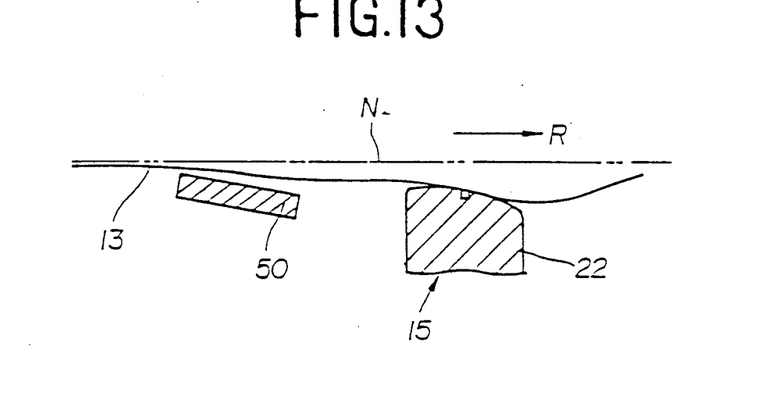

In another example, as shown in FIG. 13, a control member 50 is disposed at the same side as the magnetic head 15 with respect to the free rotary surface N of the magnetic disc 13 and at the upstream side of the magnetic head 15 with respect to the rotational direction of the magnetic disc 13. In association with rotation of the magnetic disc 13, a negative pressure is generated between the control member 50 and the magnetic disc 13 to attract the magnetic disc 13 towards the magnetic head 15 side, thereby even further improving the effect of the above-described various types of negative pressure generation type control members formed on the head chip 22 at the end of the magnetic head 15.

Figure 14:
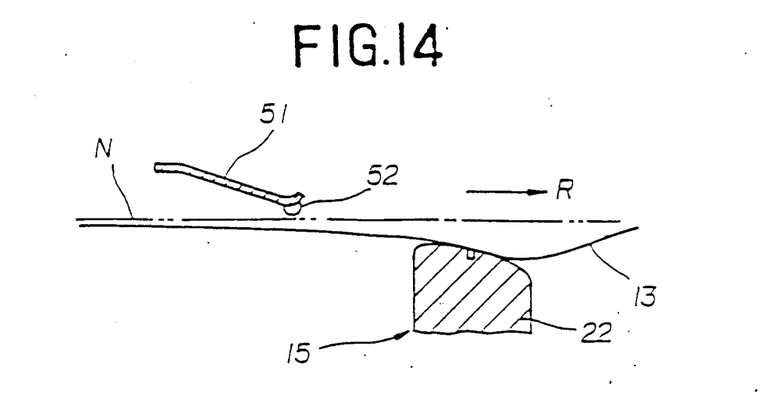

Alternatively, as shown in FIG. 14, the positive pressure generation type control member 49 shown in FIG. 12 may be formed as a plate spring 51. In this case, a positive pressure is generated between the magnetic disc 13 and the plate spring 51 to push the magnetic disc 13 towards the magnetic head 15 side and, at the same time, the magnetic disc 13 is also pushed towards the magnetic head 15 side by the urging force of the plate spring 51. Therefore, the end of the plate spring 51 at the magnetic disc 13 side, which may come in contact against the magnetic disc 13, is provided with a pad 52 to protect the magnetic disc 13 from damaging. However, the previously-described control members 49 and 50 and the plate spring 51 are not necessarily required.

Figure 15:
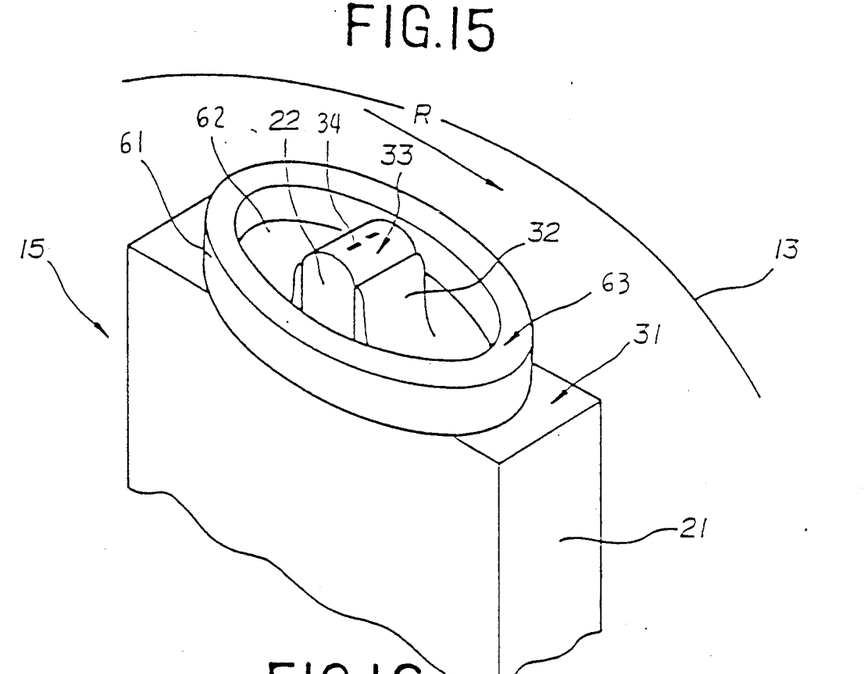
FIG. 15 and FIG. 16 are schematic perspective views showing other embodiments of the inventive magnetic head.

Referring to FIG. 15 which is a schematic perspective view showing another embodiment, a ring-formed control member 61 surrounding the head chip 22 is formed integrally with the head mount 21 on a front surface 31 of the head mount 21. This control member 61, as the magnetic disc 13 rotates, generates a negative pressure in the area between a groove 62, which is formed by the inner peripheral surface of the ring-formed control member 61 and the front surface 31 of the head mount 21, and the magnetic disc 13 to attract the magnetic disc 13 towards the head chip 22 side and cause it to come in sliding contact against the magnetic gap 34 of a sliding surface 33, thereby achieving a stable head touch. In addition, an inclined surface formed to become more distant from the standstill magnetic disc 13 towards the inner periphery of a front surface 63 of the control member 61 can be provided, thereby varying the magnitude of the negative pressure generated.

The magnetic head 15, which is provided with the head mount 21, the head chip 22, and the control member 61, can be mounted to the carriage 17 or the like as in the case of prior art systems, and can be moved on the recording surface of the magnetic disc 13 by moving the carriage 17. With the negative pressure generation type control member 61 disposed in the vicinity of the head chip 22, generation of negative pressure by other control members having the same effect positioned farther from the head chip 22 can be improved, thereby achieving an improved head touch, and both the head chip 22 and the control member 34 can be previously positioned precisely to the head mount 21, thereby considerably reducing the positioning procedure with improved positioning precision over positioning adjustment of the individual members.

Figure 16:
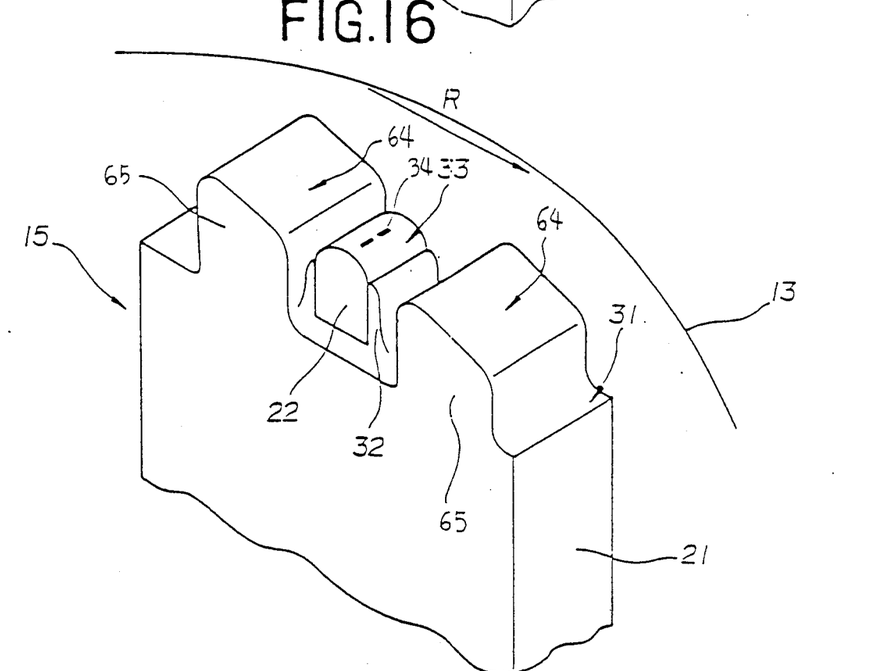

Referring to FIG. 16 which is a schematic view showing another embodiment, in place of the ring-formed control member 61 used in the above embodiment, a control member 65, which has inclined surfaces 64 individually formed on the side opposing the magnetic disc 13 at the upstream side and the downstream side of the head chip 22 with respect to the rotational direction (arrow R) of the magnetic disc 13, is protrudingly provided on the front surface 31 of the head mount 21. These inclined surface 64 are formed to become gradually more distant from the recording surface of the magnetic disc 13 towards the downstream side with respect to the rotational direction of the magnetic disc 13. As the magnetic disc 13 rotates, a negative pressure is generated between the inclined surfaces 64 and the magnetic disc 13 to attract the magnetic disc 13 towards the head chip 22 side and cause it to come in sliding contact against the magnetic gap 34 of the sliding surface 33.

In the embodiments shown in FIG. 15 and FIG. 16, the ring-formed control member and the control member having inclined surfaces 37 are individually used as control members. However, configuration of the control member is not restricted to these embodiments, but any types of control members can alternatively be used which are formed integrally with the head mount 21 to generate a negative pressure between the member and the magnetic disc 13 in association with rotation of the magnetic disc 13 and attract the magnetic disc 13 towards the head chip 22 side.

We claim:

1. A magnetic head, having an opposing surface for location in a radial direction opposite a recording surface of a magnetic disc which defines a free rotary plane when rotated in a rotational direction, and a magnetic gap formed on said opposing surface, said head comprising:
   a control portion formed on said opposing surface for generating a negative pressure between said control portion and said magnetic disc as said magnetic disc rotates, thereby attracting said magnetic disc towards said magnetic gap, wherein said control portion comprises first and second inclined surfaces inclined to gradually become more distant from said free rotary plane of said magnetic disc towards a downstream side with respect to the rotational direction of said magnetic disc, said first and second inclined surfaces having different angles of inclination relative to said free rotary plane.

2. The magnetic head of claim 1 wherein an inclination angle of said inclined surface relative to said free rotary plane of said magnetic disc is varied along the rotational direction of said magnetic disc.

3. The magnetic head of claim 1 or claim 2 wherein said control portion is provided with at least one groove formed along the rotational direction of said magnetic disc.

4. The magnetic head of claim 3 wherein said at least one groove also is disposed along said radial direction.

5. The magnetic head of claim 3 wherein said at least one groove is formed continuously from an upstream to a downstream direction.

6. The magnetic head of claim 5 wherein said at least one groove has an arc shape along said rotational direction.

7. The magnetic head of claim 1 wherein said gap is formed at an intersection of said first and second surfaces, said gap extending in the radial direction of the disc.

8. The magnetic head of claim 1 wherein said control portion causes said magnetic disc to come in sliding contact with said magnetic head.

9. A magnetic head comprising a head mount and a head chip mounted to said head mount and being operative in a sliding relationship with a magnetic disc which defines a free rotary plane when rotated in a rotational direction, said head further comprising:
   a control means formed integrally with said head mount for generating a negative pressure between said control means and said magnetic disc to attract said magnetic disc towards a side of said head chip, wherein said control portion comprises first and second inclined surfaces inclined to gradually become more distant from said free rotary plane of said magnetic disc towards a downstream side with respect to the rotational direction of said magnetic disc, said first and second inclined surfaces having different angles of inclination relative to said free rotary plane.

10. The magnetic head of claim 9 further comprising means formed integrally with said head mount for controlling air flow in said rotational direction.

11. The magnetic head of claim 10 wherein said means acts to stabilize laminar air flow.

12. The magnetic head of claim 9 further comprising an auxiliary control member located upstream of said magnetic head for generating a positive pressure.

13. The magnetic head of claim 9 wherein said head mount further comprises a head end disposed at an upstream portion of said mount and made of a wear resistant material.

* * * * *